(12) United States Patent
Giaccardi et al.

(10) Patent No.: US 11,739,668 B2
(45) Date of Patent: Aug. 29, 2023

(54) SEALING ARRANGEMENT

(71) Applicant: Liebherr-Components Colmar SAS, Colmar (FR)

(72) Inventors: Richard Giaccardi, Colmar (FR); Hugues Winkelmuller, Sainte Coix en Plaine (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 17/648,639

(22) Filed: Jan. 21, 2022

(65) Prior Publication Data
US 2022/0235680 A1     Jul. 28, 2022

(30) Foreign Application Priority Data

Jan. 22, 2021  (DE) .................... 10 2021 101 303.8

(51) Int. Cl.
*F01M 11/00*      (2006.01)
*F16J 15/06*      (2006.01)
*F02F 11/00*      (2006.01)

(52) U.S. Cl.
CPC .......... *F01M 11/0004* (2013.01); *F16J 15/06* (2013.01); *F01M 2011/0062* (2013.01); *F02F 11/00* (2013.01)

(58) Field of Classification Search
CPC ....... F01M 11/0004; F01M 2011/0062; F01M 2011/005; F01M 2011/0087; F01M 2011/0037; F16J 15/06; F16J 15/10; F02F 11/00
See application file for complete search history.

(56) References Cited

U.S. PATENT DOCUMENTS

| 3,817,354 A | 6/1974 | Meiners |
| 4,068,646 A | 1/1978 | Hnojsky |
| 4,597,583 A * | 7/1986 | Inciong ................. F16J 15/121 277/637 |

(Continued)

FOREIGN PATENT DOCUMENTS

| DE | 2851179 A1 | 6/1979 |
| DE | 19622678 C1 | 8/1997 |

(Continued)

OTHER PUBLICATIONS

European Patent Office, Extended European Search Report Issued in Application No. 22152180.0, dated Jun. 23, 2022, Germany, 7 pages.

(Continued)

*Primary Examiner* — Syed O Hasan
(74) *Attorney, Agent, or Firm* — McCoy Russell LLP

(57) ABSTRACT

Sealing arrangement for an internal combustion engine for sealing at least one interface of an oil pan assembly, comprising an O-ring for sealing a first interface between an upper edge portion of the oil pan assembly and a bottom side of an engine casing, wherein the O-ring extends in a plane formed by the first interface. The sealing arrangement further comprises at least one molded seal for sealing a second interface between two connectable parts of the engine, wherein the molded seal comprises two seal end portions comprising sealing areas to be sealingly connected to the O-ring.

21 Claims, 9 Drawing Sheets

(56) References Cited

U.S. PATENT DOCUMENTS

| | | | |
|---|---|---|---|
| 4,669,432 A * | 6/1987 | Harada | F01M 11/0004 |
| | | | 123/196 R |
| 6,003,878 A | 12/1999 | Noble et al. | |
| 10,273,842 B2 | 4/2019 | Clark et al. | |
| 2009/0145395 A1 | 6/2009 | Ishii et al. | |
| 2010/0066033 A1 | 3/2010 | Jessberger et al. | |
| 2016/0169388 A1 * | 6/2016 | Halla | F16J 15/10 |
| | | | 277/641 |
| 2019/0145518 A1 * | 5/2019 | Panchangam Nivarthi | |
| | | | F02F 11/002 |
| | | | 277/591 |

FOREIGN PATENT DOCUMENTS

| | | |
|---|---|---|
| DE | 19638817 A1 | 3/1998 |
| EP | 0661420 B1 | 9/1996 |
| EP | 0831258 A2 | 3/1998 |
| EP | 1688595 B1 | 6/2009 |
| EP | 2981691 B1 | 5/2019 |
| KR | 20050041224 A | 5/2005 |
| WO | 2016099828 A1 | 6/2016 |

OTHER PUBLICATIONS

European Patent Office, Extended European Search Report Issued in Application No. 22152155.2, dated Jun. 23, 2022, Germany, 7 pages.

* cited by examiner

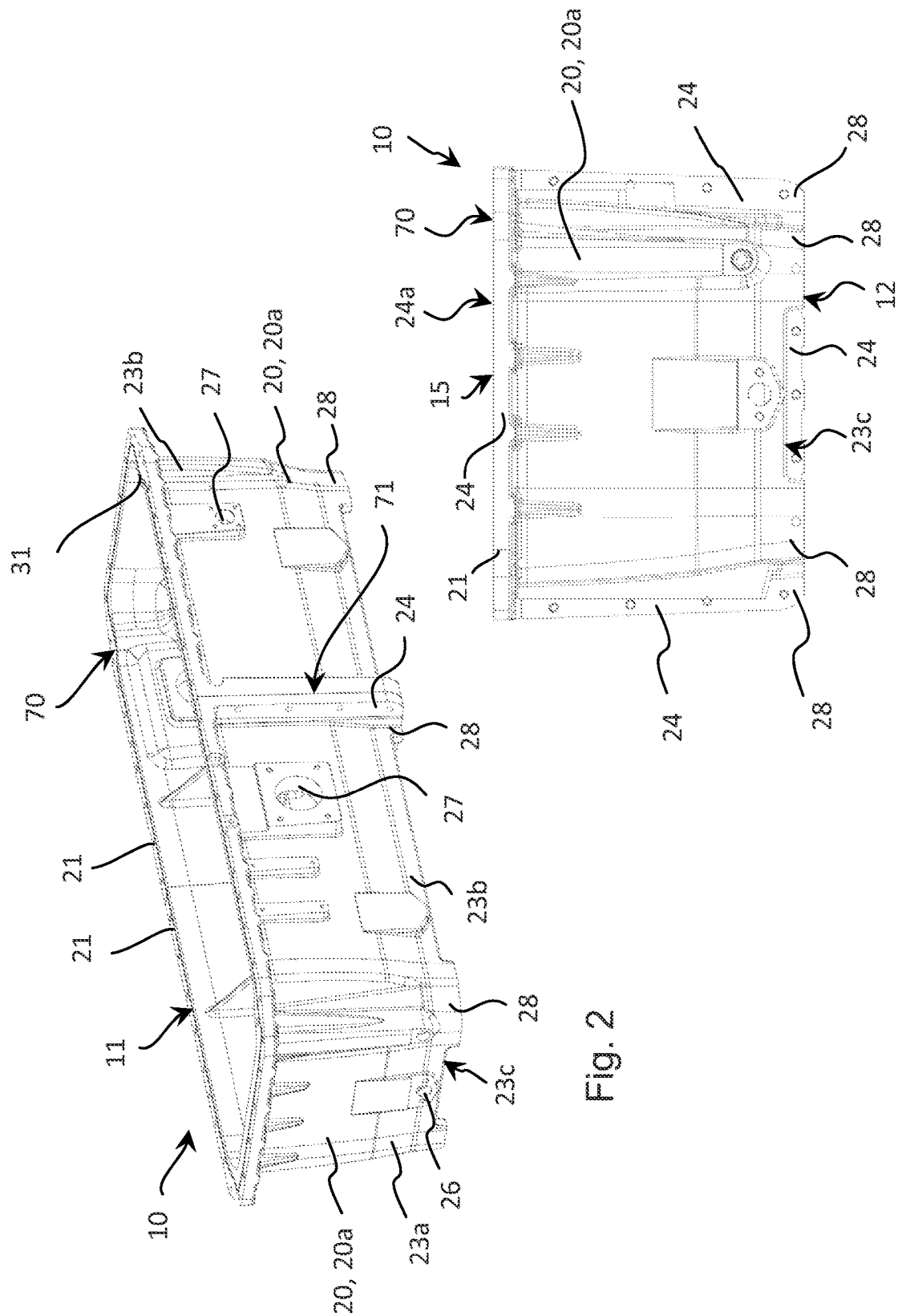

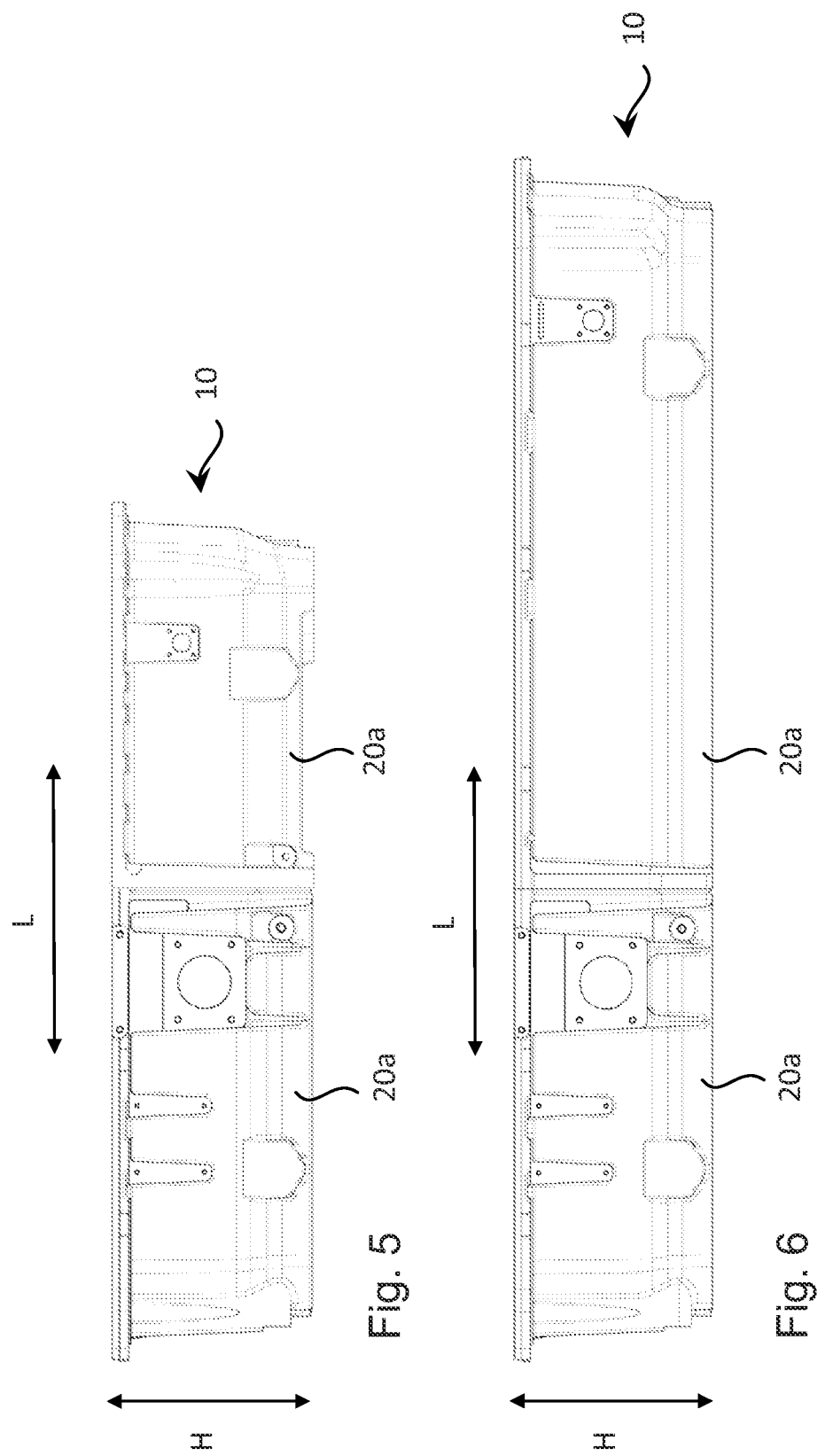

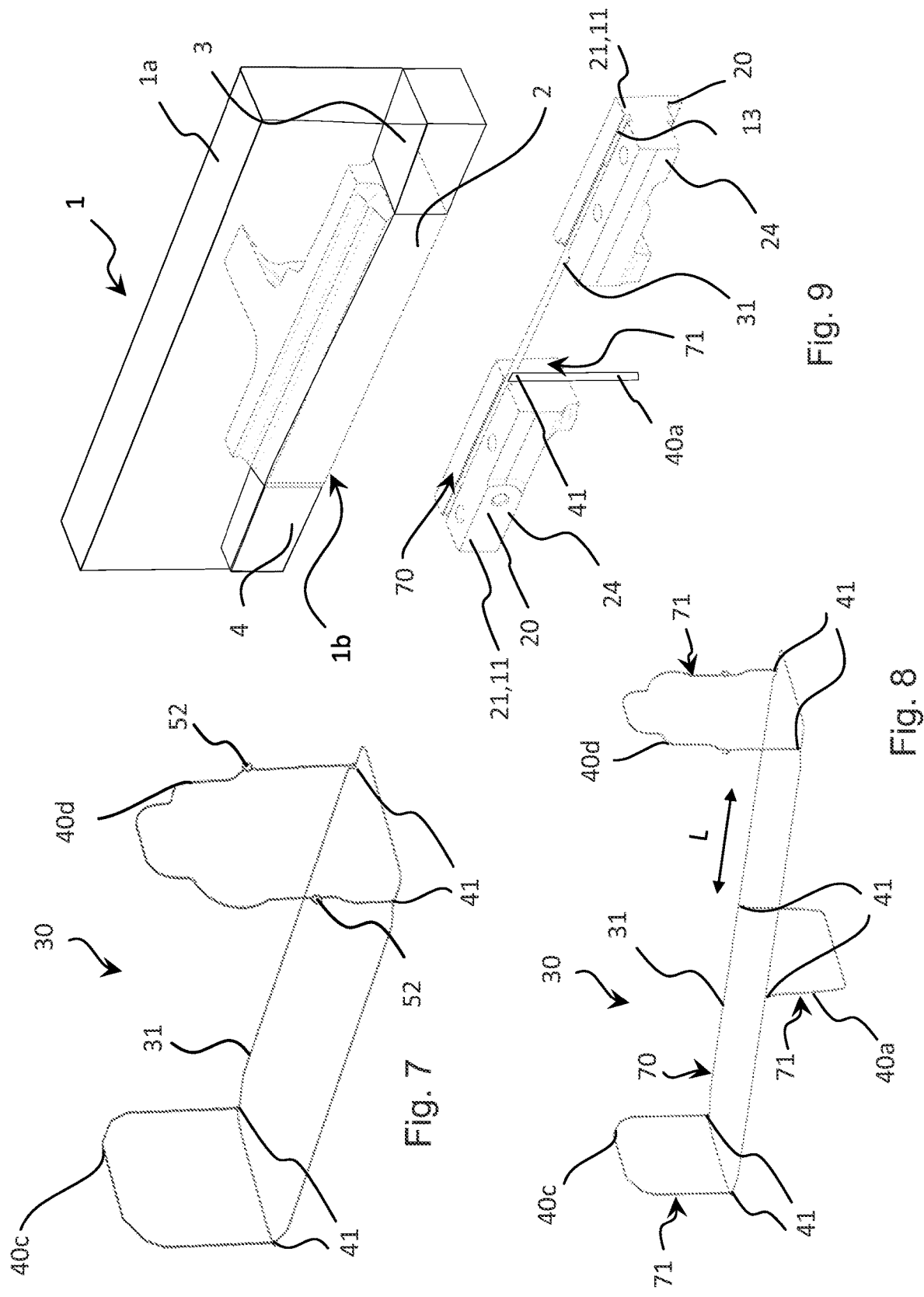

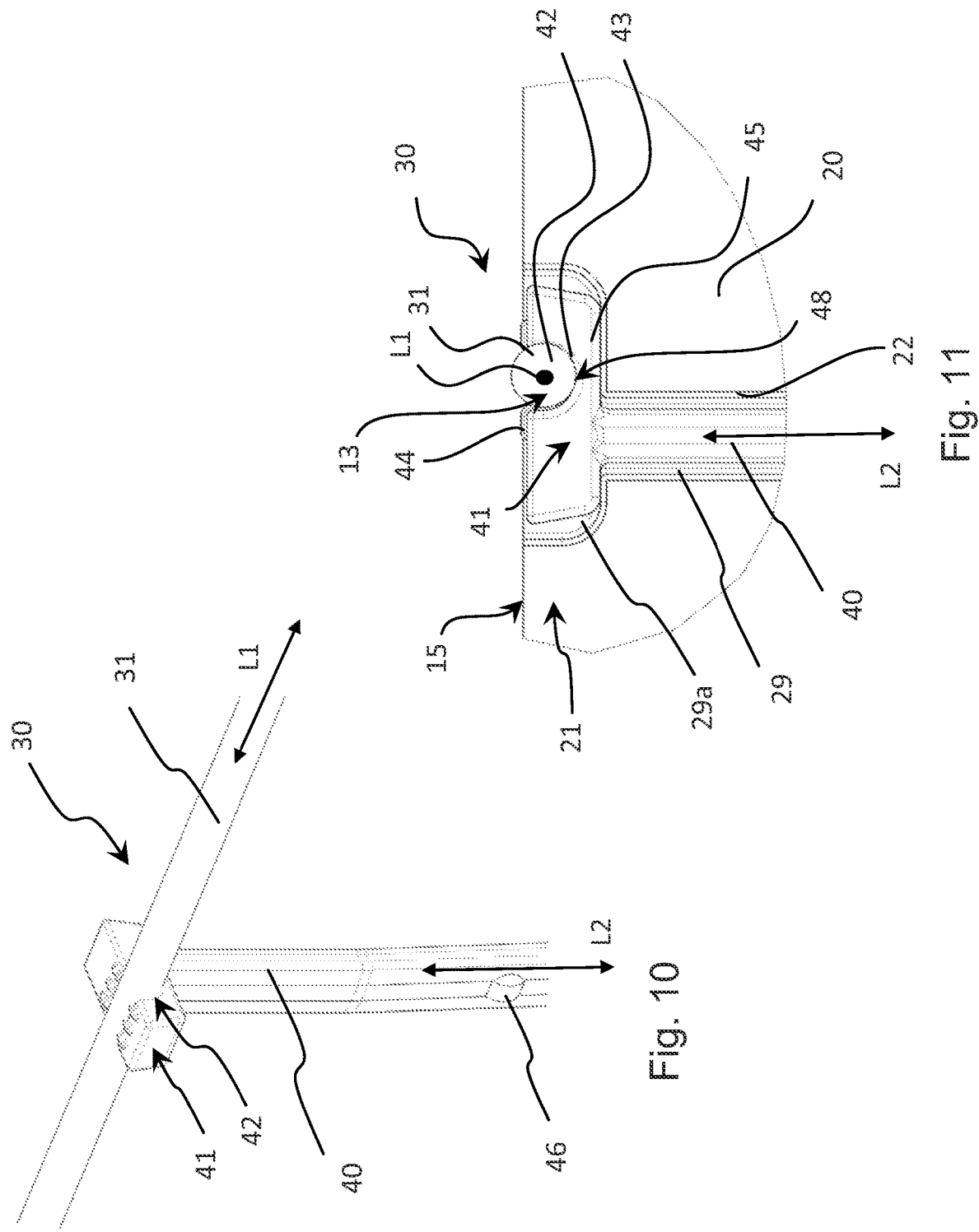

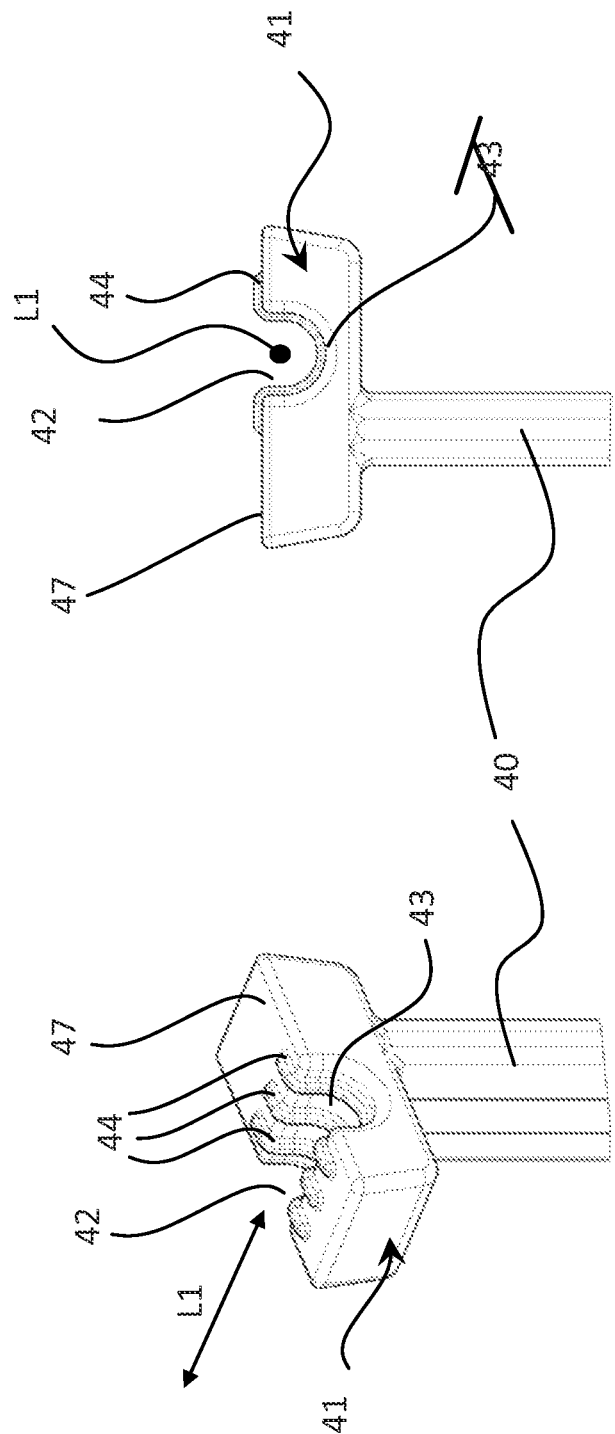

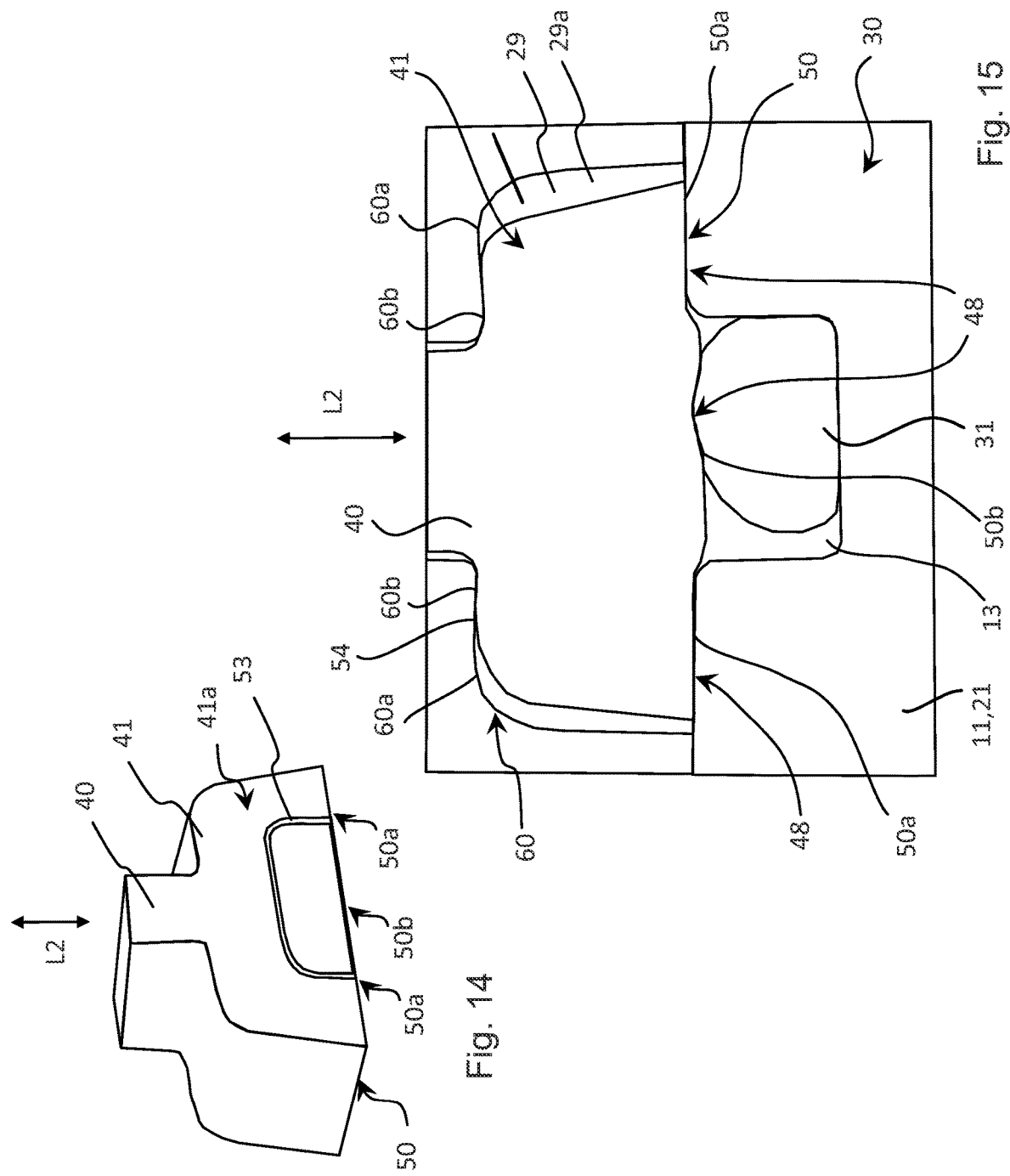

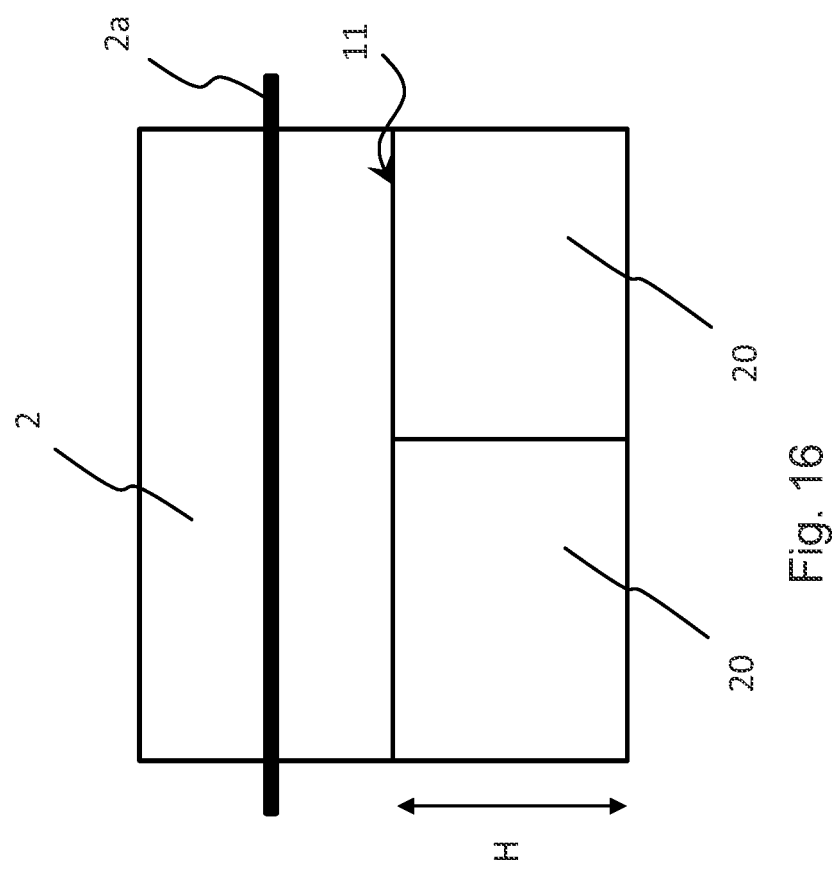

SEALING ARRANGEMENT

CROSS-REFERENCE TO RELATED APPLICATION

The present application claims priority to German Patent Application No. 10 2021 101 303.8 filed on Jan. 22, 2021. The entire contents of the above-listed application is hereby incorporated by reference for all purposes.

TECHNICAL FIELD

The present disclosure relates to a sealing arrangement for an internal combustion engine.

BACKGROUND

In internal combustion engines, the sealing of two adjacent parts of the oil pan assembly and the engine casing is important to prevent oil from leaking through a first interface between the two adjacent parts. Especially when a third part is attached to the two adjacent parts, a second interface must be sealed. When these three adjacent parts are joined together, further adequate sealing of a transition area located between the first and second interfaces may be required.

SUMMARY

U.S. Pat. No. 4,068,646 shows an oil pan comprising two separate sections each of which is secured independently to the engine as well as to each other, wherein a gasket is secured between the overlapping edges of sections and so as to provide an effective seal when the oil pan is installed under the engine block. It is suggested that the gasket is secured by passing a fastener through it.

Further, for large combustion engines such as found in V12 to V20 vehicles, molded seals specifically adapted to the parts to be sealed are generally used for the sealing between the oil pan and the engine casing parts. Such molded seals are however expensive to manufacture, especially in view of for large interfaces present in such engines.

The object of the present disclosure is therefore to provide an improved sealing solution.

The above-mentioned object of providing an improved sealing is solved by a sealing arrangement and/or a molded seal and/or an internal combustion engine.

The present disclosure provides a sealing arrangement for an internal combustion engine for sealing at least one interface of an oil pan assembly, comprising an O-ring for sealing a first interface between an upper edge portion of the oil pan assembly and a bottom side of an engine casing and at least one molded seal for sealing a second interface between two connectable parts of the engine. The O-ring extends in a plane formed by the first interface. The molded seal comprises two seal end portions comprising sealing areas to be sealingly connected to the O-ring.

Thus a simple and effective sealing solution is provided for sealing two interfaces. Further the sealing arrangement according to the disclosure provides a cost reduced solution due to its simple structure comprising an O-ring and at least one molded seal.

In an embodiment of the present disclosure, the second interface may transverse to the first interface, wherein the second interface can be orthogonal to the first interface and/or to a longitudinal direction of the engine.

In an embodiment of the present disclosure, the second interface is arranged vertically.

In an embodiment of the present disclosure, the O-ring has the same cross-section over its entire extension.

In an embodiment of the present disclosure, the sealing areas are provided on a front end side of the seal end portions and contact a side surface of the O-ring. In particular, the side surface of the O-ring contacted by the sealing area may be formed by one side of constant cross-section of the O-ring.

In an embodiment of the present disclosure, a groove is provided in the sealing surface of at least one seal end portion for retaining the O-ring. In particular, the groove may form a sealing area for sealing with the O-ring.

In an embodiment of the present disclosure, the groove is provided in a front end side of the seal end portion.

In an embodiment of the present disclosure, the O-ring is arranged in a first groove, which is provided in the upper edge portion of the oil pan assembly or in the bottom side of the engine casing.

In an embodiment of the present disclosure, the O-ring is arranged in a groove arrangement formed by the first groove and at least one second groove.

In an embodiment of the present disclosure, the second groove is arranged in a seal end portion of the molded seal.

In some embodiments, one or more sealing ribs protrude from a surface of the second groove towards the O-ring, wherein the one or more sealing ribs may be arranged transversely, such as orthogonally, to a longitudinal extension of the O-ring.

The arrangement of the O-ring in a groove provides a simple solution of holding the O-ring in place. In addition, the O-ring may not have to be manufactured in a certain shape, instead the O-ring may be produced shapeless so a so be adaptable to the specific shape of the first groove.

In an embodiment of the present disclosure, the O-ring is manufactured with the same cross-section over its entire extension. The cross-section may in particular be circular in the uncompressed state of the O-Ring. The O-ring may be formed by connecting the ends of a sealing cord.

By arranging the O-ring in a groove arrangement, the transition areas respectively being present between three connectable parts of the engine (for example two segments of the oil pan assembly and a crankcase of the engine casing) can be effectively and safely sealed.

The sealing ribs may increase local pressure when the O-ring is pressed against the molded seal, thus improving the sealing. The sealing ribs ensure a better interference between the O-ring and the molded seal.

In an embodiment of the present disclosure, an imaginary extension of a longitudinal extension of at least one molded seal does not cross with a second groove of the at least one molded seal.

In an embodiment of the present disclosure, an imaginary extension of a longitudinal extension of at least another one molded seal crosses with a second groove of the at least another one molded seal.

If the second groove is arranged such that it does not cross with a longitudinal extension of the molded seal, in a compressed state, which means when the O-ring is pressed against a surface of the second groove, a displacement of the molded seal may be avoided, since the seal end portion of the molded seal may be for the most part pressed against a blocking surface and/or against an enlarged retaining portion of a groove in which the molded seal may be arranged.

In an embodiment of the present disclosure, the molded seal is arranged in a groove provided in one of the surfaces forming the second interface.

In an embodiment of the present disclosure, the seal end portion is arranged in an enlarged retaining portion of the groove such that when the O-ring is pressed against the sealing area, a shoulder portion of the seal end portion is pressed against a surface of the enlarged retaining portion of the groove so as to block a displacement of the seal end portion.

In particular, the seal end portion, in which the second groove is provided, may be arranged in an enlarged retaining portion of the groove such that when the O-ring is pressed against a surface of the second groove, a shoulder portion of the seal end portion is pressed against a surface of the enlarged retaining portion of the groove so as to block a displacement of the seal end portion.

In an embodiment of the present disclosure, at least one molded seal comprises two seal end portions each having a sealing surface and a shoulder portion.

When the O-ring is pressed against the sealing surface of a respective seal end portion, the shoulder portion of the respective seal end portion is pressed against a retaining surface of a part of the engine, wherein the retaining surface may be formed in an enlarged retaining portion of a groove provided in one of the surfaces forming the second interface.

For instance, the retaining surface is formed in a crankcase of the engine and/or in a flywheel housing of the engine and/or in a front end of the engine casing.

In an embodiment of the present disclosure, the molded seal may contact a side of the O-ring facing away from the first groove.

For instance, both in a compressed and in an uncompressed state, the sealing surface of such a molded seal may be flat or convex.

In an embodiment of the present disclosure, the at least one seal end portion and/or the retaining surface for blocking the seal end portion is configured such that in a mounted state a portion of the seal end portion, a portion of the sealing surface facing the O-ring, such as a middle portion of the sealing surface, reaches into the first groove.

In an embodiment of the present disclosure, at least one molded seal with two seal end portions each having a second groove is provided.

For example, the molded seal with the second grooves is arranged between two segments of the oil pan assembly.

In an embodiment of the present disclosure, at least one molded seal with two seal end portions each having a sealing surface is arranged at a side of the O-ring facing away from the first groove. For instance, the sealing surfaces are flat or convex. In certain embodiments, the molded seal with the sealing surfaces is arranged between a crankcase and another part of the engine casing, such as a flywheel housing and/or a front end of the engine casing.

In an embodiment of the present disclosure, the O-ring consists of a flexible material and/or is shapelessly manufactured so as to be adaptable to a particular design of a first groove in which the O-ring is arranged. The first groove is provided in the upper edge portion of the oil pan assembly or in the bottom side of the engine casing.

In an embodiment of the present disclosure, the at least one molded seal is manufactured in a certain shape.

In an embodiment of the present disclosure, each molded seal is compressed by two adjacent surfaces of attachable parts of the engine. The two adjacent surfaces may be attached to each other by means of fasteners leading through interspaced openings provided in one or more flanges. The flanges are respectively rigidly connected to the respective adjacent surface.

In an embodiment of the present disclosure, the upper edge portion of the oil pan assembly presses the O-ring against the bottom side of the engine casing by means of fasteners leading through interspaced openings provided in one or more further flanges, which are respectively rigidly connected to the bottom side of the engine casing and/or the upper edge portion of the oil pan assembly.

In an embodiment of the present disclosure, at least one molded seal comprises one or more shoulder portions extending from the at least one molded seal transverse to its longitudinal extension for preventing a displacement in its longitudinal extension.

In an embodiment of the present disclosure, the at least one molded seal is arranged in a groove, wherein the groove is provided in one of two surfaces adjacent to and compressing the at least one molded seal.

In an embodiment of the present disclosure, at least one molded seal comprises at least one opening, such as with an O-shaped form, wherein an oil channel may lead through the respective opening.

In an embodiment of the present disclosure, the bottom side of the engine casing is formed by a bottom side of a crankcase of the engine casing and/or by a bottom side of a flywheel housing of the engine casing and/or by a bottom side of a front end of the engine casing.

Thus an improved sealing may be provided around an oil channel, which runs across two connectable parts of the engine.

In an embodiment of the present disclosure, the oil pan assembly comprises at least two segments, wherein between each two adjacent segments at least one molded seal is provided. In an upper edge portion of each segment a groove is provided such that the segments form a first groove in which the O-ring is arranged. For instance, each seal end portion of the molded seal provided between two adjacent segments may comprise a second groove in which the O-ring is arranged, thus the first groove and the second grooves may form a groove arrangement for the arrangement of the O-ring.

In an embodiment of the present disclosure, the sealing arrangement further comprises a third and/or a fourth molded seal. The third and/or the fourth molded seal each have two seal end portions respectively being connected to the O-ring so as to seal respective transition regions. The sealing surface of the seal end portions may be flat or convex in shape.

The third molded seal may be provided between a side surface of a crankcase of the engine casing and a side surface of a flywheel housing of the engine casing.

the fourth sealing may be provided between an other side surface of the crankcase and a side surface of a front end of the engine casing.

For instance, the third and/or the fourth molded seal may comprise at least one opening, such as with an O-shaped form, wherein an oil channel may lead through the respective opening.

For example, the third molded seal may be arranged in a third groove provided in the side surface of the crankcase or the side surface of the flywheel housing. The fourth molded seal may be arranged in a fourth groove provided in the other side surface of the crankcase or in the side surface of the front end.

In some embodiments, the third and/or the fourth molded seal contacts the O-ring at a position where it is retained in the first groove. Therefore, in particular, the interface sealed by the third and/or the fourth molded is provided at a different axial position than the interface sealed by the first molded seal.

In an embodiment the first interface extends in a single plane.

In an embodiment the second interface extends in a single plane.

In an embodiment, all the second interfaces sealed by molded seals of the sealing arrangement extends in a single plane.

In an embodiment, all the second interfaces sealed by molded seals are arranged in different axial positions along an axial direction of the engine. In particular, for an oil part assembly comprising at least two segments, an interface between the segments of the oil pan assembly will be provided at a position that is axially spaced apart from a position of an interface between two parts of the engine casing, such as an interface between a crankcase housing and flywheel housing or an interface between a crankcase housing and a front end housing.

The present disclosure further comprises a molded seal for a sealing arrangement, the molded seal comprising at least one seal end portion with a sealing surface, with a groove being provided in the sealing surface for retaining an O-ring.

For instance, the molded seal has the features already described above with respect to the sealing arrangement of the present disclosure.

Further, the molded seal may be part of the inventive sealing arrangement or used for an inventive sealing arrangement.

The present disclosure further comprises an internal combustion engine, comprising a sealing arrangement and/or comprising a molded seal as described above.

In an embodiment, the internal combustion engine comprises at least twelve cylinders and/or is a V-type engine.

In an embodiment, the oil pan assembly is a casted part and/or comprises at least two casted segments.

In an embodiment, the oil pan assembly has length of at least 1000 mm, wherein the length of the oil pan assembly corresponds to its extension in a longitudinal direction of the engine. The longitudinal direction of the engine corresponds to the extension of its crankshaft.

In an embodiment of the present disclosure, the engine casing is a crankcase, such that the upper edge portion of the oil pan assembly is attached to a bottom side of the crankcase. In an embodiment of the present disclosure, a crankshaft extends within the crankcase.

In an embodiment of the present disclosure, a rotational axis of the crankshaft extends at a level above the upper edge portion of the oil pan assembly forming the first interface to the engine housing.

In an embodiment of the present disclosure, the crankshaft is supported at at least two opposite end portions in the crankcase.

In an embodiment of the present disclosure, the crankshaft extends through at least one opening provided in a sidewall of the crankcase. A bottom side of the sidewall of the crankcase extending below the opening may be attached to an upper edge portion of the oil pan assembly.

In an embodiment of the present disclosure, the oil pan assembly and in particular the at least two segments of the oil pan assembly is/are attached to a bottom side of the crankcase.

BRIEF DESCRIPTION OF THE FIGURES

The present disclosure will now be described with reference to embodiments and drawings.

The figures show:

FIG. 2 an isometric view of the embodiment shown in FIG. 1 in a state in which the two segments are attached to each other;

FIG. 3 a side view from the left of the embodiment shown in FIG. 2;

FIG. 4b a front view of an embodiment comprising an oil pan assembly having two end segments and a middle segment being different to the middle segment of the embodiment shown in FIG. 4a;

FIG. 5 a front view of an embodiment comprising an oil pan assembly having two end segments;

FIG. 6 a front view of an embodiment comprising an oil pan assembly having two end segments, wherein the end segment on the left in FIG. 6 is identical to the end segment shown on the left in FIG. 5;

FIG. 7 an isometric view of an embodiment comprising a sealing arrangement having an O-ring and two molded seals;

FIG. 8 an isometric view of an embodiment comprising a sealing arrangement having an O-ring and three molded seals;

FIG. 9 an isometric, partly explosive view of an embodiment showing schematically an internal combustion engine comprising an oil pan assembly with two segments and comprising a sealing arrangement with an O-Ring and a molded seal;

FIG. 10 an isometric view of an embodiment comprising a sealing arrangement with an O-ring and a molded seal, the O-ring being arranged in a groove provided in the molded seal, wherein the sealing arrangement is shown separate from a casing;

FIG. 11 a side view from the left of the embodiment of the sealing arrangement shown in FIG. 10, wherein the sealing arrangement is arranged in a groove;

FIG. 12 an isometric view of an embodiment comprising a molded seal with a seal end portion having sealing ribs;

FIG. 13 a side view from the left of the embodiment shown in FIG. 12;

FIG. 14 an isometric view of an embodiment comprising a molded seal having a sealing protrusion;

FIG. 15 a cross-sectional view of an embodiment comprising a molded seal for being arranged at a side of the O-ring facing away from a first groove in which the O-ring is arranged; and FIG. 16 a front view of an embodiment comprising an oil pan assembly having two end segments, a crankcase, and a crankshaft leading through two openings provided in the crankcase.

DETAILED DESCRIPTION

Figure 1:
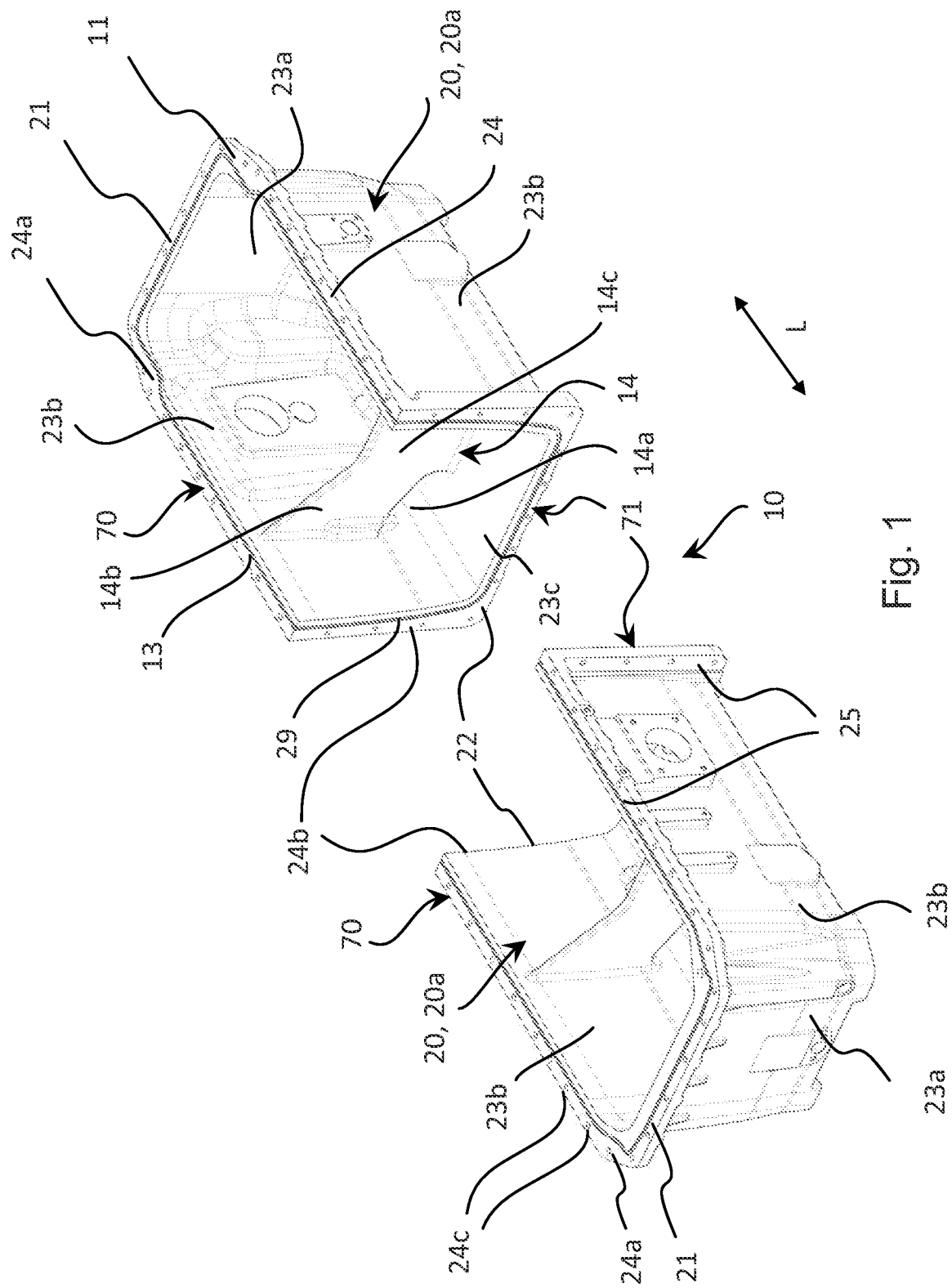
FIG. 1 an isometric view of an embodiment comprising an oil pan assembly having two segments and a sealing arrangement, the embodiment being shown in a demounted state.

FIG. 1 shows an embodiment of the present disclosure with an oil pan assembly 10 and a sealing arrangement 30, wherein several aspects of the present disclosure are realized in combination. However, the features of these aspects described in the embodiment may also be realized separately.

According to a first aspect of the present disclosure an internal combustion engine 1 is provided having an oil pan assembly 10 which comprises at least two segments 20, wherein the segments 20 are casted parts.

Figure 4A:
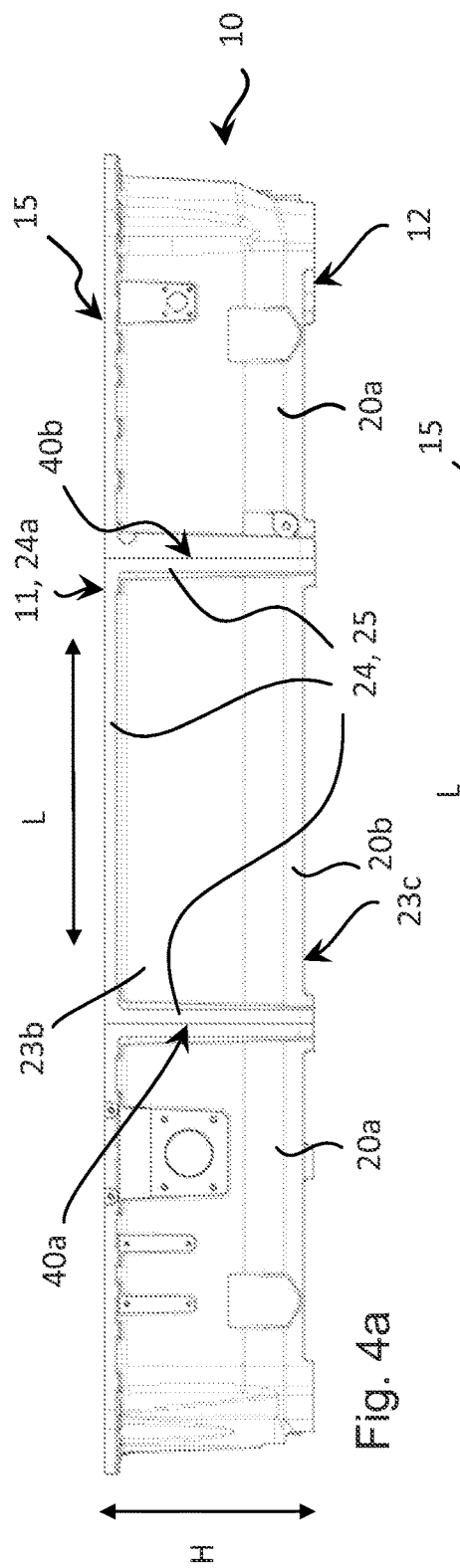
FIG. 4a a front view of an embodiment comprising an oil pan assembly having two end segments and one middle segment.
Figure 4B:
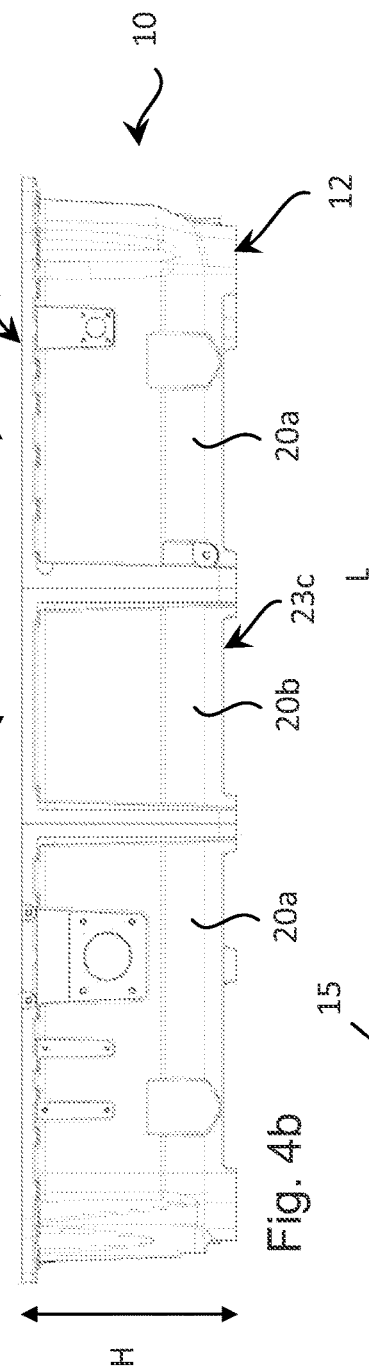

As can be seen in FIG. 1 the oil pan assembly 10 comprises two segments 20 being two end segments 20a, which respectively comprise an end wall 23a, two side walls 23b, and a bottom wall 23c, the walls forming a part of the oil pan assembly 10. As can be seen in FIG. 4a and FIG. 4b the oil pan assembly 10 may comprise a middle segment 20b, which comprises a bottom wall 23c and two side walls 23b (only one of the two side walls 23b is respectively shown in FIG. 4a and FIG. 4b).

The embodiment shown in FIG. 1 comprises an oil pan assembly 10 with two segments 20, wherein the embodiment is shown in a demounted state. The two segments 20 can be attached to each other at a second interface 71 and to a bottom side of an engine casing at a first interface 70 (not shown) by fasteners (not shown) which may lead through interspaced openings 24c provided in flanges 24. In a mounted state, the segments 20 are attached to each other and to the underside of the engine thus compressing a sealing arrangement for sealing the respective interfaces between the parts.

In the embodiment shown in FIG. 1, the upper edge portion 11 of the oil pan assembly 10 is provided with a first groove 13 for receiving a sealing element for sealing the first interface 70 with the bottom side of an engine casing (not shown). One of the end faces 22 of the segments 20 is equally provided with a groove 29 receiving a sealing element for sealing the second interface 71 between the two segment end surfaces 22 of the segments 20.

The two segments 20 of the embodiment shown in FIG. 1 are casted parts, wherein the segments 20 are arranged next to each other in a longitudinal direction L of the engine (not shown). The longitudinal direction L of the engine corresponds to the axial extension of a crankshaft 2a (for example shown in FIG. 16) of the engine.

In the embodiment shown in FIG. 1 the segments 20 each comprise a segment end surface 22 being such configured that when the segments 20 are attached to each other the segment end surfaces 22 form the second interface 71 between the segments 20. The second interface 71 shown in the embodiment extends in a plane which is orthogonal to the longitudinal direction L, wherein the first interface 70 between the upper edge portion 11 of the oil pan assembly 10 and the bottom side of the engine (not shown) is orthogonal to the second interface 71.

As shown in FIG. 1 each segment 20 may comprise a flange 24 that entirely surrounds the edge 25 of the respective segment 20. Further also a middle segment 20b, as shown in FIG. 4a, may comprise a flange 24 that entirely surrounds the middle segment 20b.

In the embodiment shown in FIG. 1 each of the segments 20 comprises a stiffening rib 14, wherein the configuration of the stiffening ribs 14 is exemplarily described regarding the stiffening rib 14 of the segment 20 shown on the right in FIG. 1. The stiffening rib 14 extends from a side wall 23b to a bottom wall 23c of the segment 20. Further the stiffening rib 14 extends from the bottom wall 23c to the other side wall 23b.

As can be seen in the embodiment shown in FIG. 1 the stiffening rib 14 comprises at least one opening 14a, which allows an oil exchange between an area at one side to an area at another side of the stiffening rib 14. For providing the opening, the stiffening rib 14 does not contact the bottom wall 23c over the entire width of the segment, such that an opening 14a is left between the bottom wall 23c and a lower edge of the stiffening rib 14 in this area. In the embodiment, openings 14a are provided on both sides of a middle portion 14c of the stiffening rib 14 connected to the bottom wall.

In the shown embodiment the stiffening rib 14 comprises a side portion 14b which is arranged closer to the side wall 23b than the middle portion 14c, wherein an upper edge of the side portion 14b reaches closer to the first interface 70 than an upper edge of the middle portion 14c. The same applies to the other side portion (not shown) of the sealing rib 14.

FIG. 2 shows the embodiment of FIG. 1 in a state, in which the segments 20 are attached to each other, wherein the oil pan assembly 10 forms an upper edge portion 11, which is formed by the segment upper edge portions 21.

The embodiment shown in FIG. 2 comprises several openings 26, 27, wherein the opening 26 provided in the oil pan assembly 10 is arranged closer to the bottom wall 23c than the other openings 27. The openings 26, 27 allow an oil exchange between an inside and an outside area of the oil pan assembly. As can be seen, the openings 26, 27 may have different diameters, in order to satisfy different application purposes.

An oil pump may be connected to the mounting area surrounding opening 27, with a suction side oil channel of the pump reaching through opening 27 into the oil pan assembly.

FIG. 3 shows a side view from the left of the embodiment shown in FIG. 2, wherein the end segment 20a comprises a flange 24 that entirely surrounds the end segment 20a and that extends in two planes that are orthogonal to each other. One of the planes forms the second interface 71, as can be seen in FIG. 2. The other plane forms the first interface 70, as can be seen in FIG. 2 and FIG. 3. The flange 24 shown in FIG. 3 comprises an upper flange surface 24a which forms a flat upper surface 15 of the oil pan assembly 10.

In the embodiment shown in FIG. 2 and FIG. 3, each end segment 20a comprises a plurality of leg portions 28, which may be integrally casted with the respective end segment 20a. As can be seen in FIG. 2 and FIG. 3 a portion of the flange 24 may form a leg portion 28.

As can be seen in FIG. 3, the end segment 20a may be such configured that when it is being placed on a flat surface, the leg portions 28 contact the flat surface to support the segment, wherein at least a part of the bottom wall 23c of the end segment 20a is spaced apart from the flat surface. In an embodiment, also a middle segment 20b, as for example shown in FIGS. 4a and 4b, may comprise the above described configuration regarding the leg portions 28.

In the embodiment, all the segments have the same height H. In particular, the distance between the bottom side of the leg portions 28 and the upper edge portion 21 of each segment 20 may be identical.

As can be seen in FIG. 2 and FIG. 3, the segments 20 may comprise stiffening ribs provided between the flange 24 and a wall, such as an outer side of a wall, of the respective segment 20.

The surfaces of the segments forming the interfaces, and in particular the segment upper edge portions 21, the segment end surfaces 22 and the grooves 13 and 29 can be formed by material removal from the casted part. In particular, the surface may be formed by milling.

According to a second aspect of the present disclosure a set comprising at least two different internal combustion engines each comprising an oil pan assembly is provided. With the following described modular concept a set of engines with oil pan assemblies is proposed, wherein each oil pan assembly is adapted to a particular size of engine, wherein the oil pan assemblies have at least one segment in common. The oil pan assemblies may in particular be adapted to different lengths of the engine which are due to a difference in the number of cylinders of the engine, wherein the different engines may have between 12 and 20 cylinders, inclusive.

Figure 4C:
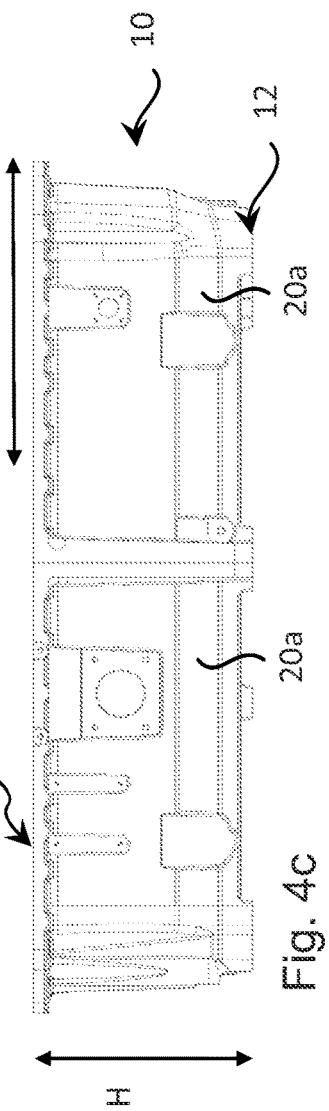
FIG. 4c a front view of an embodiment comprising an oil pan assembly having two end segments being directly connected to each other.

The embodiment of a set shown in FIGS. 4a, 4b, and 4c comprises three different engines (not shown) each having an oil pan assembly 10. Each of the shown oil pan assemblies 10 comprises two end segments 20a, wherein the end segments 20a of the oil pan assembly 10 shown in FIG. 4a are identical to the end segments 20a of the oil pan assemblies 10 shown in FIGS. 4b and 4c. The end segments 20a shown in FIG. 4c are attached to each other directly. Regarding FIG. 4b a middle segment 20b is arranged between the two end segments 20b, wherein the segments 20a, 20b are connected to each other respectively. A further modification is possible, as can be seen FIG. 4a, in which a middle segment 20b of a different length than that shown in FIG. 4b is arranged between the two end segments 20a. Thus a set of three different oil pan assemblies with three different lengths can be provided with only four different segments (end segment 20a shown on the left in FIG. 4a, end segment 20a shown on the right in FIG. 4a, middle segment 20b shown in FIG. 4a, and middle segment 20b shown in FIG. 4b).

In another embodiment, as for example shown in FIGS. 5 and 6, it is also conceivable to provide a set comprising at least two different internal combustion engines (not shown), wherein the engines respectively comprise a first identical end segment 20a, in FIGS. 5 and 6 the respective end segment 20a on the left, wherein the engines further comprise respectively a second end segment 20a, in FIGS. 5 and 6 the respective end segment 20a on the right, being (directly) connected to the first end segment 20a, wherein the second end segments 20a of the engines are different, and for instance, have different lengths, as can be seen in FIGS. 5 and 6.

In the embodiment shown in FIG. 4a, the edge 25 of the middle segment 20b is formed by a flange 24, wherein the flange 24 entirely surrounds the edge 25 of the middle segment 20b.

The height H of a segment 20a, 20b is defined as its extension from its bottom side 12 to its upper surface 15, as shown in FIG. 4a. The segments 20a, 20b of the embodiment shown in FIG. 4a each comprise the same height H. The same applies to the segments of the embodiments shown in FIGS. 4b and 4c, FIG. 5 and FIG. 6. As can be seen from FIGS. 4a to 4c the embodiments each comprise segments 20a, 20b having an equal height H.

The length of the oil pan assembly 10 is defined as its extension in a direction parallel to the longitudinal direction L of the engine, as can be seen in FIGS. 4a to 4c and in FIGS. 5 and 6. In other words the length of an oil pan assembly 10 is defined as its extension from an outer end of an end segment 20a (in FIGS. 4a to 4c on the left) to an outer end of the other end segment 20a (in FIGS. 4a to 4c respectively on the right).

The embodiment of the set shown in FIGS. 4a to 4c comprises three different oil pan assemblies 10 having different lengths, thus the respective oil pan assembly 10 being designed for a particular engine size. The embodiment of the set shown in FIGS. 5 to 6 comprises two different oil pan assemblies 10 having different lengths, thus the respective oil pan assembly 10 being designed for a particular engine size.

For example the oil pan assembly 10 shown in FIG. 4a, 4b, 4c may be designed for an engine having 20, 16, 12 cylinders, respectively, wherein the respective engine can be a V-type engine.

In the embodiment shown in FIG. 4a the oil pan assembly 10 comprises a length greater than 2000 mm and/or is designed for an engine having 20 cylinders.

In the embodiment shown in FIG. 4b the oil pan assembly 10 comprises a length greater than 1500 mm and/or is designed for an engine having 16 cylinders.

In the embodiment shown in FIG. 4c the oil pan assembly 10 comprises a length greater than 1000 mm and/or is designed for an engine having 12 cylinders.

In an embodiment the internal combustion engine 1 comprising the sealing arrangement 30 and/or the oil pan assembly 10 may be a V-type engine and/or comprises more than 12 cylinders.

Regarding the embodiment shown in FIGS. 4a and 4b a first and a second molded seal 40a, 40b may be provided between the end segment 20a shown on the left and the middle segment 20b and between the middle segment 20b and the end segment 20a shown on the right, respectively. Regarding the embodiment shown in FIGS. 5 and 6, a first molded seal (not shown) may respectively be provided between the end segments 20a.

The oil pan assemblies described with respect to the second aspect of the present disclosure may have the configuration already described with respect to the first aspect.

In particular, in the embodiment, the end segments 20 of the oil pan assembly shown in FIGS. 1 to 3 are used as the end segments 20a of the oil pan assemblies shown in FIGS. 4a to 4c. Therefore, the oil pan assembly shown in FIG. 4c is the same oil pan assembly already described with respect to FIGS. 1 to 3.

As shown in FIG. 16, the internal combustion engine may comprise a crankshaft 2a, the rotational axis of which extends at a level above the first interface 70 between the upper edge portion 11 of the oil pan assembly 10 and the engine casing.

In the embodiment, the rotational axis of the crankshaft 2a extends above the level of the upper edge portion 11 of the oil pan assembly through a crankcase forming the engine housing, the bottom side of which is attached to the upper edge portion 11 of the oil pan assembly. In particular, the at least two segments 20, 21 of the oil pan assembly may be attached to a bottom side of a crankcase 2.

The crankcase 2 supports the crankshaft 2a at two opposite end portions of the crankshaft 2a.

At least one end of the crankshaft 2a extends through an opening provided in the crankcase 2. In the shown embodiment, the crankshaft 2a extends through a first opening provided in a first sidewall of the crankcase 2 and/or extends through a second opening provided in a second, opposed sidewall of the crankcase 2. Lower edge portions of the first and/or second sidewalls may be sealingly connected to upper edge portions 11 of the oil pan assembly.

According to a third aspect of the present disclosure, a sealing arrangement 30 may be provided having an O-ring 31 and at least one molded seal 40.

The O-ring 31 consists of a flexible material and/or is shapelessly manufactured. It can therefore be adapted to a certain shape of a first groove 13.

The O-ring has the same cross-section over its entire extension and forms a closed loop. It may for example be provided by connecting two ends of a sealing cord. The cross-section may be circular when the O-ring is uncompressed.

The molded seal (40) comprises two seal end portions (41) comprising sealing areas (48) to be sealingly connected to the O-ring (31). In particular, the sealing areas (48) are provided on a front end side of the seal end portions (41) and contact a side surface of the O-ring.

The embodiment shown in FIG. 7 comprises a sealing arrangement 30 having an O-ring 31, a third molded seal 40c, and a fourth molded seal 40d. The O-ring 31 is provided for sealing a first interface between an upper edge portion (not shown) of an oil pan assembly and a bottom side (not shown) of an engine casing.

The molded seals 40c, 40d respectively comprise two seal end portions 41, which are respectively sealingly connected to the O-ring 31.

In the shown embodiment the molded seal 40c is provided for sealing an interface between a crankcase (not shown) and a flywheel housing (not shown), wherein the molded seal 40c can be arranged in a groove provided in the flywheel housing or the crankcase housing. The molded seal 40d is provided for sealing an interface between the crankcase housing and a front end housing (not shown) of the engine, wherein the molded seal 40d may be arranged in a groove provided in the front end housing or the crankcase housing.

As shown in FIG. 7 the molded seal 40d may comprise two openings 52 for allowing an oil channel to pass through.

The seal end portions 41 of the third and the fourth molded seal 40c, 40d shown in FIG. 7 can be of the type shown in FIGS. 14 and 15, wherein the O-ring 31 may be arranged in a first groove 13 of an oil pan assembly. The molded seals 40c, 40d may contact a side of the O-ring, which faces away from the first groove.

In the embodiment shown in FIG. 7 the O-ring 31 extends in a single plane, wherein the molded seals 40c, 40d extend transversally thereto.

Further, in the shown embodiment the sealing arrangement 30 may be provided for an oil pan assembly (not shown) being made out of one part.

The embodiment shown in FIG. 8 comprises a sealing arrangement 30 having a first molded seal 40a, a third molded seal 40c, and a fourth molded seal 40c. In the shown embodiment the first molded seal 40a is provided for sealing a second interface between two segments (not shown) of an oil pan assembly 10, the second interface 71 therefore being a segment interface 71. The molded seal 40a extends in a plane which may be orthogonal to the first interface 70, as shown in FIG. 8, wherein the O-ring 31 extends in the first interface 70. The third and fourth molded seals 40c, 40d extend respectively in further second interfaces 71.

Each of the molded seals 40a, 40c, and 40d shown in FIG. 8 comprises two seal end portions 41.

The two seal end portions 41 of the first molded seal 40a may be of the type shown in FIGS. 10 to 13, wherein the seal end portions 41 of the third and fourth molded seal 40c, 40d may be of the type shown in FIGS. 14 and 15.

In the embodiment shown in FIGS. 7 and 8 the first groove (not shown) can be provided in an upper edge portion of an oil pan assembly (not shown).

In the embodiment shown in FIGS. 7 and 8, such as the molded seals 40a, 40c, 40d, are respectively manufactured in a certain shape.

In the embodiment shown in FIG. 9, an internal combustion engine 1 is shown schematically. The embodiment is shown in a demounted state. The engine 1 comprises an oil pan assembly, wherein only small portions of two segments 20 are illustrated, and a sealing arrangement, wherein only small portions of the molded seal 40 and the O-ring 31 are illustrated. In the shown embodiment the engine casing 1a comprises a bottom side 1b, which is formed by a bottom side of a crankcase 2, by a bottom side of a front end 3, and/or by a bottom side of a flywheel housing 4. In FIG. 9 the crankcase 2, the front end 3, and the flywheel housing 4 are illustrated schematically.

In the embodiment shown in FIG. 9 the O-ring 31 is arranged in the first groove 13 which is provided in the upper edge portion 11 of the oil pan assembly (which is in particular formed by the segment upper edge portions 21), wherein the O-ring 31 is provided for sealing the first interface 70 between the upper edge portion 11 and the bottom side 1b of the engine casing 1a.

The first molded seal 40a is sealingly connected to the O-ring 31 and extends between the two segments 20 so as to seal the second interface 71 which is formed there between.

In an embodiment, the seal end portion 41 of the first molded seal 40a between two segments 20, as shown in FIG. 9, may comprise a seal end portion 41 with a second groove 42, as for example shown in FIGS. 10 to 13, in which the O-ring 31 can be arranged. Thus the first groove 13 and the second groove 42 may form a continuous groove 13,42 for the O-ring 31, the continuous groove 13,42 being a groove arrangement 13,42.

When the segments 20 shown in the embodiment of FIG. 9 are attached to each other and to the underside 1b of the engine casing 1a, such as by using fasteners leading through openings provided in the shown flanges 24, the O-ring 31 and the first molded seal 40a are compressed by respective adjacent surfaces so as so seal the respective interfaces 70, 71.

According to a fourth aspect of the present disclosure a molded seal 40 for the sealing arrangement 30 comprises a groove for retaining the O-ring 31.

According to the embodiments shown in FIGS. 10 to 13 a sealing arrangement 30 is provided for sealing a transition region between at least three connectable parts of an internal combustion engine. The shown embodiments of the sealing arrangement 30 may be provided for sealing the transition region being present between two segments of an oil pan assembly and an a bottom side of an engine casing, as described with respect to the third aspect.

The O-ring 31 shown in the embodiment illustrated in FIG. 10 has a longitudinal extension L1 and is arranged in the second groove 42, which is provided in the seal end portion 41 of the molded seal 40. The molded seal 40 may be a first molded seal 40a for sealing an interface between two segments of an oil pan assembly (not shown). In the shown embodiment the molded seal 40 comprises a longitudinal extension L2, which runs vertically in the drawing plane of FIG. 10.

As shown, the molded seal 40 may comprise a retaining portion 46 that protrudes from the molded seal 40 transverse to its longitudinal extension L2. Thus a displacement of the molded seal 40 may be blocked, when the O-ring 31 is pressed towards the seal end portion 41.

The embodiment shown in FIG. 11 comprises a sealing arrangement 30 being identical to the one shown in FIG. 10, wherein in FIG. 11 the molded seal 40 is arranged in the groove 29 with the seal end portion 41 of the molded seal 40 being arranged in an enlarged retaining portion 29a of the groove 29.

The seal end portion 41 is formed by an enlarged shoulder portion 45 retained in the enlarged retaining portion 29a of the groove 29. In particular, the enlarged retaining portion 29a of the groove 29 may extend perpendicular to the longitudinal extension of the molded seal L2 and the O-ring L1 along an edge formed between the first and the second interface. The enlarged shoulder portion 45 of the molded seal may extend within the enlarged retaining portion 29a, such that retaining surfaces 29b formed by the bottom of the enlarged retaining portion 29a retain bottom surfaces 45a of the enlarged shoulder portion 45 on both sides of the molded seal.

When the O-ring 31 is pressed against the surface 43 of the second groove 42 provided in the seal end portion 41, the shoulder portion extending in the enlarged retaining portion 29a blocks a displacement of the seal end portion 41.

In the embodiment shown in FIG. 11 the seal end portion 41 comprises a sealing area 48 formed by the second groove 42.

The O-ring 31 is arranged in the second groove 42 and a first groove 13, wherein the first groove 13 is provided in the segment upper edge portion 21 of the segment 20. The O-ring is therefore arranged in a groove arrangement 13, 42, which is formed by the first groove 13 and the second groove 42. In other words, the first groove 13 and the second groove 42 may form a continuous groove 13, 42 in which the O-ring 31 can be arranged.

The molded seal 40 can be provided between two segments 20 of the oil pan assembly 10, wherein in FIG. 11 only one of the two segments 20 is partly shown. In the shown embodiment the groove 29 with its enlarged retaining portion 29a is formed in the segment 20, more precisely in an segment end surface 22. As shown in FIG. 11, the segment 20 comprises a segment upper edge portion 21 which forms a flat upper surface 15 of the oil pan assembly (not shown).

In an alternative embodiment a sealing arrangement 30 with a molded seal 40 having a second groove 42 provided in its seal end portion 41 for retaining an O-ring 31 may be arranged between a crankcase of the engine and another part of the engine casing connectable thereto, wherein a first groove 31 for retaining the O-ring 31 can be formed in a bottom side of the engine casing.

In the embodiment shown FIG. 11 the second groove 42 is such arranged in the seal end portion 41, that an imaginary extension of the longitudinal extension L2 of the molded seal 40 (more precisely the axial center line of the longitudinal extension L2 of the molded seal 40) does not cross with the second groove 42.

In other words, the center of the second groove 42 is arranged at a distance to an imaginary extension of a side wall 22 of the groove 29 and therefore at a position above a bottom surface of the enlarged retaining portion 29a of the groove.

In this case, when the O-ring 31 is pressed against a surface 43 of the second groove 42, the bottom side of the shoulder portion 45 of the seal end portion 41 is pressed against a bottom surface of the enlarged retaining portion 29a of the groove. Thus a displacement of the seal end portion 41 is blocked.

In an alternative embodiment, the second groove 42 may be arranged in the seal end portion 41 such that an imaginary extension of the longitudinal extension L2 of the molded seal 40 (more precisely the axial center line of the longitudinal extension L2 of the molded seal 40) crosses with the second groove 42.

It is also conceivable to provide an embodiment of a molded seal having one seal end portion 41 with a second groove 42 being arranged such that it does not cross with the imaginary extension of the longitudinal extension L2 of the respective molded seal 40, and having another seal end portion 41 with another second groove 42 being arranged such that it does cross with the imaginary extension of the longitudinal extension L2 of the molded seal 40.

The embodiment shown in FIG. 12 and FIG. 13 illustrates a molded seal 40 having a seal end portion 41 comprising three sealing ribs 44. The molded seal 40 shown in FIG. 12 and in FIG. 13 is identical to the one shown in FIG. 10 and FIG. 11. As shown in FIG. 12 and FIG. 13, the sealing ribs 44 protrude from a surface 43 of the second groove 42 and may reach from one side of the sealing surface 47 of the seal end portion 41 over the surface 43 of the second groove 42 to the other side of the sealing surface 47. In the shown embodiment the sealing ribs 44 extend orthogonally to a longitudinal extension L1 of the O-ring 31 (not shown).

As can be seen in FIG. 11, the O-ring 31 may be pressed, such as by a bottom side of an engine casing (not shown), against the sealing ribs 44 such that O-ring 31 compresses the sealing ribs 44 towards the surface 43 of the second groove 42. Thus an enhanced sealing can be provided.

FIGS. 14 and 15 illustrate an embodiment of a molded seal 40, which may be provided between a side surface of a crankcase (not shown) and another side surface of a part of the engine casing connectable to the crankcase. Referring to FIG. 9, the molded seal 40 shown in FIG. 14 may be provided between the crankcase 2 and the flywheel housing 4 and/or between the crankcase 2 and the front end 3, wherein the molded seal 40 shown in FIGS. 14 and 15 may be provided at a side of the O-ring 31 facing away from the first groove 13.

As illustrated in FIG. 14, the seal end portion 41 of the molded seal 40 equally comprises an enlarged shoulder portion, which is retained in an enlarged retaining portion of a groove in the same way as the enlarged shoulder portion of the embodiments of the molded seal described earlier.

As shown in FIG. 15, the sealing surface 50 of the molded seal 40 is pressed against an O-ring 31 arranged in a first groove 13. In the shown embodiment the first groove 13 is provided in an upper edge portion 11 of an oil pan assembly (not shown).

As can be seen in FIG. 14, the sealing surface 50 of the molded seal 40 has a flat shape and extends in a single plane when the seal is uncompressed. In alternative embodiments, if might also have a convex shape, for example a middle portion protruding from the sealing surface.

In FIG. 15 the sealing arrangement 30 is shown in a mounted state, the sealing arrangement 30 therefore being in a compressed state, which means that the upper edge portion 11 of the oil pan assembly (not shown) presses the O-ring 31 against the sealing surface 50 of the molded seal 40.

The seal end portion 41 shown in FIG. 15 is such configured that in the shown mounted state a portion of the seal end portion 41 reaches into the first groove 13. More precisely, the middle portion 50b of the sealing surface 50 of the seal end portion 41 reaches into the first groove 13. With the shown embodiment it is possible that the sealing surface 50 adapts its shape at least partially to the O-ring. The sealing between the O-ring 31 and the molded seal 40 can be enhanced consequently. As can be seen in FIG. 15 the middle portion 50b is arranged between two side portions 50a of the sealing surface 50.

Further FIG. 15 illustrates that the seal end portion 41 of the molded seal 40 may be such configured that the side portions 50a of the sealing surface 50, in a mounted state, are pressed against respective surfaces of the upper edge portion 11, which are respectively arranged adjacent to the surface of the first groove 13, which means that the surfaces are arranged at one and on another side of the first groove 13, in FIG. 15 to the left and to the right of the first groove 13, respectively.

Subsequently, in a mounted state, beside the sealing between the O-ring 31 and the middle portion 50b of the sealing surface 50, at least another sealing can be provided between the respective side portions 50a of the sealing surface 50 and the respective surface of the upper edge portion 11. In the shown embodiment of FIG. 15 three sealing areas are provided: between the O-ring 31 and the middle portion 50b of the sealing surface 50, between one side portion 50a (in FIG. 15 on the left) of the sealing surface 50 and the respective surface of the upper edge portion 11, and between the other side portion 50a (in FIG. 15 on the right) of the sealing surface 50 and the respective surface of the upper edge portion 11.

Referring to FIG. 15, the retaining surface 60 of the enlarged retaining portion of the groove in which the molded seal 40 is provided blocks the shoulder surface 54 of the enlarged shoulder portion of the seal end portion 40. The retaining surface 60 may comprise an outer portion 60a and an inner portion 60b, wherein the inner portion 60b is arranged closer to a center axis of the longitudinal extension L2 of the molded seal 40 than the outer portion 60a, wherein the inner portion 60b may extend closer to the bottom side of the engine casing than the outer portion 60a. Subsequently the effect of at least a part of the seal end portion 41, such as the middle portion 50b, reaching into the first groove 13 in a mounted stated can be enhanced.

In the embodiment shown in FIG. 15 the seal end portion 41 comprises sealing areas 48, which are formed by the middle portion 50b and respective side portions 50a of the sealing surface 50.

As described above, the molded seal 40 shown in FIG. 15 may be arranged in a groove 29, wherein the seal end portion 41 may be provided in a enlarged retaining portion 29a of the groove 29. Referring to FIG. 9, the groove 29 may be provided in the front end 3, the crankcase 2 and/or the flywheel housing 4 of the engine casing 1a, the groove 29 may however be provided in the front end and/or the flywheel housing 4. In the embodiment shown in FIG. 15 the enlarged retaining portion 29a of the groove 29 forms the retaining surface 60 for blocking the seal end portion 41.

As shown in FIG. 14, the seal end portion 41 may be provided on a side surface facing the groove 29 and/or the side surface facing the other engine part with a sealing protrusion 53. The sealing protrusion 53 may protrude from a side surface 41a of the seal end portion 41 in a direction transverse to the longitudinal extension L2 of the molded seal 40, wherein the sealing protrusion 53 may extend from one side portion 50a of the sealing surface 50 to the respective other side portion 50a of the sealing surface 50, such as in a U-shaped form.

The configuration of the sealing arrangement shown in FIGS. 10 to 14 may in particular be used with the sealing arrangements described with respect to FIGS. 7 to 9.

Further, the sealing arrangements described with respect to FIGS. 8 to 14 may in particular be used with the oil pan assemblies described with respect to FIGS. 1 to 6.

The sealing arrangement described with respect to FIG. 7 may be used with an oil pan assembly where the oil pan is a single casted part.

FIGS. 1-6 are drawn to scale, although other relative dimensions may be used.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

REFERENCE SIGN LIST 1 internal combustion engine
1a engine casing
1b bottom side of engine casing
2 crankcase
2a crankshaft
3 front end
4 flywheel housing
10 oil pan assembly
11 upper edge portion
12 bottom side of oil plan assembly/segment
13 first groove
14 stiffening rib
14a opening of stiffening rib
14b side portion of stiffening rib
14c middle portion of stiffening rib
15 flat upper surface
20 segment
20a end segment
20b middle segment
21 segment upper edge portion
22 segment end surface
23a end wall
23b side wall
23c bottom wall
24 flange
24a upper flange surface
24b flange end surface
24c openings provided in the flange
25 edge
26 opening
27 opening
28 leg
29 groove
29a enlarged retaining portion of groove
30 sealing arrangement
31 O-ring 40 molded seal
40a first molded seal
40b second molded seal
40c third molded seal
40d fourth molded seal
41 seal end portion
41a side surface of seal end portion
42 second groove
43 surface of second groove
44 sealing rib
45 shoulder portion
46 retaining portion of molded seal
47 sealing surface of a molded seal being arranged at a side of the O-ring facing the first groove
48 sealing area of seal end portion
50 sealing surface of a molded seal being arranged at a side of the O-ring facing away from the first groove
50a side portion of sealing surface
50b middle portion of sealing surface
52 opening for oil channel
53 sealing protrusion
54 retaining surface
60 blocking surface
60a outer portion of blocking surface
60b inner portion of blocking surface
70 first interface
71 second interface, segment interface
L longitudinal direction of the engine
L1 Longitudinal extension of O-ring
L2 Longitudinal extension of molded seal
H segment height

The invention claimed is:

1. A sealing arrangement for an internal combustion engine for sealing at least one interface of an oil pan assembly, comprising:
an O-ring for sealing a first interface between an upper edge portion of the oil pan assembly and a bottom side of an engine casing, wherein the O-ring extends in a plane formed by the first interface; and
at least one molded seal for sealing a second interface between two connectable parts of the engine, wherein the molded seal comprises two seal end portions comprising sealing areas to be sealingly connected to the O-ring,
wherein the O-ring has the same cross-section over its entire extension, and wherein the sealing areas are provided on a front end side of the seal end portions and contact a side surface of the O-ring.

2. The sealing arrangement according to claim 1, wherein O-ring forms a closed loop.

3. A sealing arrangement for an internal combustion engine for sealing at least one interface of an oil pan assembly, comprising:
an O-ring for sealing a first interface between an upper edge portion of the oil pan assembly and a bottom side of an engine casing, wherein the O-ring extends in a plane formed by the first interface;
at least one molded seal for sealing a second interface between two connectable parts of the engine, wherein the molded seal comprises two seal end portions comprising sealing areas to be sealingly connected to the O-ring;
a first groove provided in the upper edge portion of the oil pan assembly or in the bottom side of the engine casing; and
a second groove provided in at least one of the seal end portions of the at least one molded seal for retaining the O-ring, the second groove extending in a direction transverse to a longitudinal extension of the at least one molded seal,
wherein the O-ring extends in a groove arrangement formed by the first groove and the second groove.

4. The sealing arrangement according to claim 3, wherein one or more sealing ribs protrude from a surface of the second groove towards the O-ring, and wherein the one or more sealing ribs are arranged transversely to a longitudinal extension of the O-ring.

5. The sealing arrangement according to claim 3, wherein an imaginary extension of a longitudinal extension of the molded seal does not cross with the second groove of the at least one molded seal, or wherein an imaginary extension of a longitudinal extension of the molded seal crosses with the second groove of the at least one molded seal.

6. The sealing arrangement according to claim 1, wherein the molded seal is arranged in a third groove provided in one of the surfaces forming the second interface, and wherein the seal end portion is arranged in an enlarged retaining portion of the third groove such that when the O-ring is pressed against the sealing areas, a shoulder portion of the seal end portion is pressed against a surface of the enlarged retaining portion of the third groove so as to block a displacement of the seal end portion.

7. The sealing arrangement according to claim 1, wherein the O-ring is arranged in a first groove provided in the upper edge portion of the oil pan assembly or in the bottom side of the engine casing, wherein the at least one molded seal sealingly contacts a side of the O-ring facing away from the first groove, and comprises the two seal end portions each having the sealing surface and a retaining surface, wherein, when the O-ring is pressed against the sealing surface of a respective seal end portion, the retaining surface of the respective seal end portion is pressed against a blocking surface, and wherein the blocking surface is formed in an enlarged retaining portion of the third groove provided in one of the surfaces forming the second interface.

8. The sealing arrangement according to claim 1, wherein the at least one molded seal with the two seal end portions each having a second groove is arranged between two segments of the oil pan assembly, and/or wherein the at least one molded seal with the two seal end portions each having the sealing surface sealingly contacting a side of the O-ring facing away from the first groove is arranged between a crankcase and another part of the engine casing, such as a flywheel housing and/or a front end of the engine casing.

9. The sealing arrangement according to claim 1, wherein the O-ring consists of a flexible material and/or is shapelessly manufactured so as to be adaptable to a particular design of a first groove in which the O-ring is arranged, wherein the first groove is provided in the upper edge portion of the oil pan assembly or in the bottom side of the engine casing, and/or wherein the at least one molded seal is manufactured in a certain shape.

10. The sealing arrangement according to claim 1, wherein each molded seal is compressed by two adjacent surfaces of attachable parts of the engine, the two adjacent surfaces being attached to each other by means of fasteners leading through interspaced openings provided in one or more flanges, which are respectively rigidly connected to the respective adjacent surface, and/or wherein the upper edge portion of the oil pan assembly presses the O-ring against the bottom side of the engine casing by means of fasteners leading through interspaced openings provided in one or more further flanges, which are respectively rigidly connected to the bottom side of the engine casing and/or the upper edge portion of the oil pan assembly.

11. The sealing arrangement according to claim 1, wherein at least one molded seal comprises at least one opening, such as with an O-shaped form, wherein an oil channel leads through the respective opening, and/or wherein the bottom side of the engine casing is formed by a bottom side of a crankcase of the engine casing and/or by a bottom side of a flywheel housing of the engine casing and/or by a bottom side of a front end of the engine casing.

12. The sealing arrangement according to claim 1, wherein the oil pan assembly comprises at least two segments, wherein between each two adjacent segments at least one molded seal is provided, and wherein in an upper edge portion of each segment a groove is provided such that the segments form a first groove in which the O-ring is arranged.

13. The sealing arrangement according to claim 11, further comprising a third and/or a fourth molded seal, wherein the third and/or the fourth molded seal each have two seal end portions respectively being connected to the O-ring so as to seal respective transition regions, wherein the third molded seal is provided between a side surface of a crankcase of the engine casing and a side surface of a flywheel housing of the engine casing, and/or wherein the fourth sealing is provided between an other side surface of the crankcase and a side surface of a front end of the engine casing.

14. The sealing arrangement according to claim 3, wherein the at least one molded seal comprises at least one seal end portion with a sealing surface with a second groove being provided in the sealing surface for retaining an O-ring, the second groove extending in a direction transverse to a longitudinal extension of the molded seal.

15. An internal combustion engine, comprising a sealing arrangement according to claim 1 and/or comprising a molded seal according to claim 14.

16. The sealing arrangement according to claim 4, wherein the one or more sealing ribs are arranged orthogonally to a longitudinal extension of the O-ring.

17. The sealing arrangement according to claim 7, wherein the blocking surface is formed in a crankcase of the engine and/or in a flywheel housing of the engine and/or in a front end of the engine casing, and wherein the seal end portion and the blocking surface are configured such that in a mounted state a portion of the seal end portion, such as a middle portion of the sealing surface facing the O-ring, reaches into the first groove.

18. The sealing arrangement according to claim 12, wherein each seal end portion of the molded seal provided between two adjacent segments comprises a second groove in which the O-ring is arranged, thus the first groove and the second groove form a groove arrangement for the arrangement of the O-ring.

19. The sealing arrangement according to claim 13, wherein the third and/or the fourth molded seal comprise at least one opening with an O-shaped form, wherein an oil channel leads through the respective opening, and/or wherein the third molded seal is arranged in a third groove provided in the side surface of the crankcase or the side surface of the flywheel housing, and the fourth molded seal is arranged in a fourth groove provided in the other side surface of the crankcase or in the side surface of the front end.

20. The internal combustion engine according to claim 15, having at least twelve cylinders.

21. A sealing arrangement for an internal combustion engine for sealing at least one interface of an oil pan assembly, comprising:
an O-ring for sealing a first interface between an upper edge portion of the oil pan assembly and a bottom side of an engine casing, wherein the O-ring extends in a plane formed by the first interface; and
at least one molded seal for sealing a second interface between two connectable parts of the engine, wherein the molded seal comprises two seal end portions comprising sealing areas to be sealingly connected to the O-ring,
wherein the molded seal further comprises a shoulder portion that protrudes from the molded seal transverse to a longitudinal extension of the molded seal and is retained in a retaining portion provided in one of the connectable parts of the engine such that when the O-ring is pressed against the sealing areas of the at least one molded seal, the shoulder portion is pressed against a blocking surface of the retaining portion so as to block a displacement of the seal end portion.

* * * * *